United States Patent
Yamanaka

(10) Patent No.: US 10,198,051 B2
(45) Date of Patent: Feb. 5, 2019

(54) PROGRAMMABLE LOGIC CONTROLLER HAVING DUAL POWER SUPPLY DEVICES AND OUTPUT ADJUSTMENT CIRCUIT

(71) Applicant: Mitsubishi Electric Corporation, Chiyoda-ku, Tokyo (JP)

(72) Inventor: Takahiko Yamanaka, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 272 days.

(21) Appl. No.: 15/063,674

(22) Filed: Mar. 8, 2016

(65) Prior Publication Data

US 2016/0187948 A1   Jun. 30, 2016

Related U.S. Application Data

(62) Division of application No. 13/635,130, filed as application No. PCT/JP2011/080319 on Dec. 27, 2011, now Pat. No. 9,568,969.

(51) Int. Cl.
   *G06F 1/26* (2006.01)
   *G06F 1/20* (2006.01)

(52) U.S. Cl.
   CPC ............... *G06F 1/263* (2013.01); *G06F 1/20* (2013.01); *G06F 1/26* (2013.01)

(58) Field of Classification Search
   CPC .................................. G06F 1/263; G06F 1/20
   See application file for complete search history.

(56) References Cited

U.S. PATENT DOCUMENTS

| 5,493,154 A | 2/1996 | Smith et al. |
| 6,714,891 B2* | 3/2004 | Dendinger ............. G06F 1/206 702/130 |
| 7,039,817 B2* | 5/2006 | Burnham ................. G06F 1/26 713/320 |

(Continued)

FOREIGN PATENT DOCUMENTS

| CN | 1477468 A | 2/2004 |
| EP | 2151904 A2 | 2/2010 |

(Continued)

OTHER PUBLICATIONS

Communication dated Jun. 14, 2016 from the German Patent and Trademark Office in counterpart Application No. 11 2011 106 046.7.

(Continued)

*Primary Examiner* — Michael Jung
(74) *Attorney, Agent, or Firm* — Sughrue Mion, PLLC; Richard C. Turner

(57) ABSTRACT

To make a replacement time difference between two power supply devices as small as possible when the two power supply devices serving as double power supply devices constitute a PLC, a power supply unit includes a temperature detection unit that detects an internal temperature of the own power supply unit, and an output adjustment circuit that adjusts internal power output from the own power supply unit so as to make smaller a difference between a detected temperature by the temperature detection unit of the own power supply unit and a detected temperature by the temperature detection unit included in the other power supply unit attached to a same PLC as the PLC to which the own power supply unit is attached.

4 Claims, 11 Drawing Sheets

(56) References Cited

U.S. PATENT DOCUMENTS

| | | | |
|---|---|---|---|
| 8,751,836 B1 | 6/2014 | Piszczek et al. | |
| 9,703,363 B2 * | 7/2017 | Zhou | G06F 1/3287 |
| 2001/0046144 A1 | 11/2001 | Murabayashi et al. | |
| 2003/0111909 A1 * | 6/2003 | Liu | H02J 1/102 307/64 |
| 2004/0025078 A1 | 2/2004 | Nagano et al. | |
| 2004/0264219 A1 * | 12/2004 | Zhang | H02J 1/102 363/21.06 |
| 2011/0140642 A1 * | 6/2011 | Kono | B60L 3/0023 318/139 |
| 2011/0145605 A1 | 6/2011 | Sur et al. | |
| 2012/0119749 A1 * | 5/2012 | Iida | H01M 10/441 324/435 |
| 2013/0002016 A1 * | 1/2013 | Furukawa | H01M 10/425 307/9.1 |
| 2013/0166087 A1 | 6/2013 | Yamanaka | |

FOREIGN PATENT DOCUMENTS

| | | | |
|---|---|---|---|
| EP | 2290383 A1 | 3/2011 | |
| JP | 8-251910 A | 9/1996 | |
| JP | 11122814 A | 4/1999 | |
| JP | 11175112 A | 7/1999 | |
| JP | 2003157117 A | 5/2003 | |
| JP | 2008148513 A | 6/2008 | |
| JP | 2008228487 A | 9/2008 | |
| JP | 2009223418 A | 10/2009 | |
| TW | 525329 B | 3/2003 | |
| WO | WO2011118112 A1 * | 9/2011 | G01R 31/36 |

OTHER PUBLICATIONS

Korean Office Action, dated Oct. 31, 2013, Application No. 10-2012-7022113.

Communication dated Dec. 16, 2015, issued by the German Patent Office in counterpart German Application No. 112011106046.7.

Taiwanese Office Action, dated Dec. 13, 2013, Application No. 101107430.

Communication dated Apr. 8, 2016 from U.S. Patent & Trademark Office in counterpart U.S. Appl. No. 13/635,130.

* cited by examiner

PROGRAMMABLE LOGIC CONTROLLER HAVING DUAL POWER SUPPLY DEVICES AND OUTPUT ADJUSTMENT CIRCUIT

CROSS-REFERENCE TO RELATED APPLICATIONS

This application is a Divisional of U.S. application Ser. No. 13/635,130 filed Sep. 14, 2012, which is a 371 of PCT Application No. PCT/JP2011/080319 filed Dec. 27, 2011; the above-noted applications incorporated herein by reference in their entirety.

FIELD

The present invention relates to a power supply device incorporated in a programmable controller (PLC) as one of double power supply devices.

BACKGROUND

As measures for improving the reliability of a PLC, there has been proposed doubling constituent unit of the PLC. By doubling the constituent unit, it is possible for the PLC to continue controlling by using the other constituent unit even if one constituent unit fails. As a representative example of a constituent unit to be doubled, there has been known a power supply unit (a power supply device) in which many life-limited components are incorporated.

To double the power supply unit, it is necessary to consider how to set the ratio of an output from each power supply unit. For example, Patent Literature 1 discloses a technique for equalizing the ratio of outputs from two power supply units.

CITATION LIST

Patent Literature

Patent Literature 1: Japanese Patent Application Laid-open No. 2008-148513

SUMMARY

Technical Problem

Some building block-type PLCs are configured so that two power supply units and other constituent units (such as a CPU unit) are arranged from one end of a base unit toward the center of the base unit without any gaps. In such a PLC, when outputs from the two power supply units are equalized as described as the technique of Patent Literature 1, the near-center power supply unit is different in exhaust heat efficiency from and higher in internal temperature than the other power supply unit attached to one of the ends of the base unit, because the other constituent units are attached to both side surfaces of the near-center power supply unit adjacently. Furthermore, the life of the near-center power supply unit becomes shorter than that of the end-side power supply unit, which causes a problem that it generates a difference in replacement cycle between the power supply units. This is because components, such as a smoothing capacitor, the degradation speeds of which accelerate as temperature rises are used in each power supply unit. When there is a difference in replacement cycle between two power supply units, the maintenance cost of the entire PLC increases.

The present invention has been achieved to solve the above problems, and an object of the present invention is to provide a power supply device that can reduce a replacement time lag between two power supply devices as much as possible when a PLC is configured to use double power supply devices.

Solution to Problem

In order to solve the above problem and in order to attain the above object, in a power supply device that is incorporated in a programmable controller (PLC) as one of double power supply devices, where each of the double power supply devices generates internal power of the PLC from alternating-current commercial power and outputs the internal power, and the power supply device being an own power supply device, the power supply device of the present invention, includes: a temperature detection unit that detects an internal temperature of the own power supply device; and an output adjustment circuit that adjusts an internal power output from the own power supply device so as to make smaller a difference between a detected temperature by the temperature detection unit of the own power supply device and a detected temperature by a temperature detection unit included in the other power supply device attached to a same PLC as the PLC to which the own power supply device is attached.

Advantageous Effects of Invention

The power supply device according to the present invention can reduce a replacement time lag between two power supply devices because it is possible to reduce the difference in degradation speeds of limited-life components between the own power supply device and the other power supply device incorporated in the same PLC by reducing the difference in internal temperature between the own and other power supply devices.

DESCRIPTION OF EMBODIMENTS

Exemplary embodiments of a power supply device according to the present invention will be explained below in detail with reference to the accompanying drawings. The present invention is not limited to the embodiments.

First Embodiment.

Figure 1:
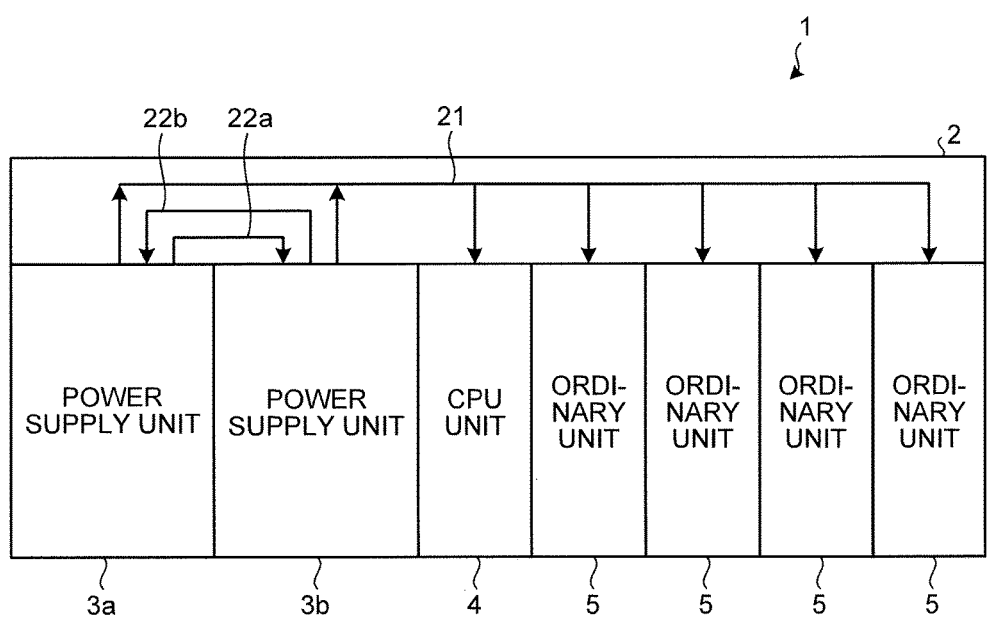
FIG. 1 is a configuration diagram of a PLC configured by using power supply units according to a first embodiment.

FIG. 1 is a configuration diagram of a PLC configured by using power supply units to each of which a power supply device according to a first embodiment is applied. As shown in FIG. 1, a PLC 1 is configured so that two power supply units 3a and 3b, a CPU unit 4, and four ordinary units 5 are attached to a base unit 2 in order from left of a sheet. The ordinary units 5 are collective names denoting constituent units other than the power supply units 3a and 3b and the CPU unit 4, and include, for example, an input unit, an output unit, a motion CPU unit, a temperature adjustment unit, and a communication unit. A user can constitute the PLC 1 by selecting desired ordinary units 5 according to an intended usage of the PLC 1.

The base unit 2 includes a power supply line 21. Each of the power supply units 3a and 3b generates internal power and supplies the generated internal power to the CPU unit 4 and the ordinary units 5 via the power supply line 21. The base unit 2 also includes signal lines 22a and 22b used to adjust the ratio of outputs from the power supply units 3a and 3b. The signal line 22a is a transmission path for a signal transmitted from the power supply unit 3a to the power supply unit 3b, and the signal is hereinafter referred to as "adjustment signal 22a".

Figure 2:
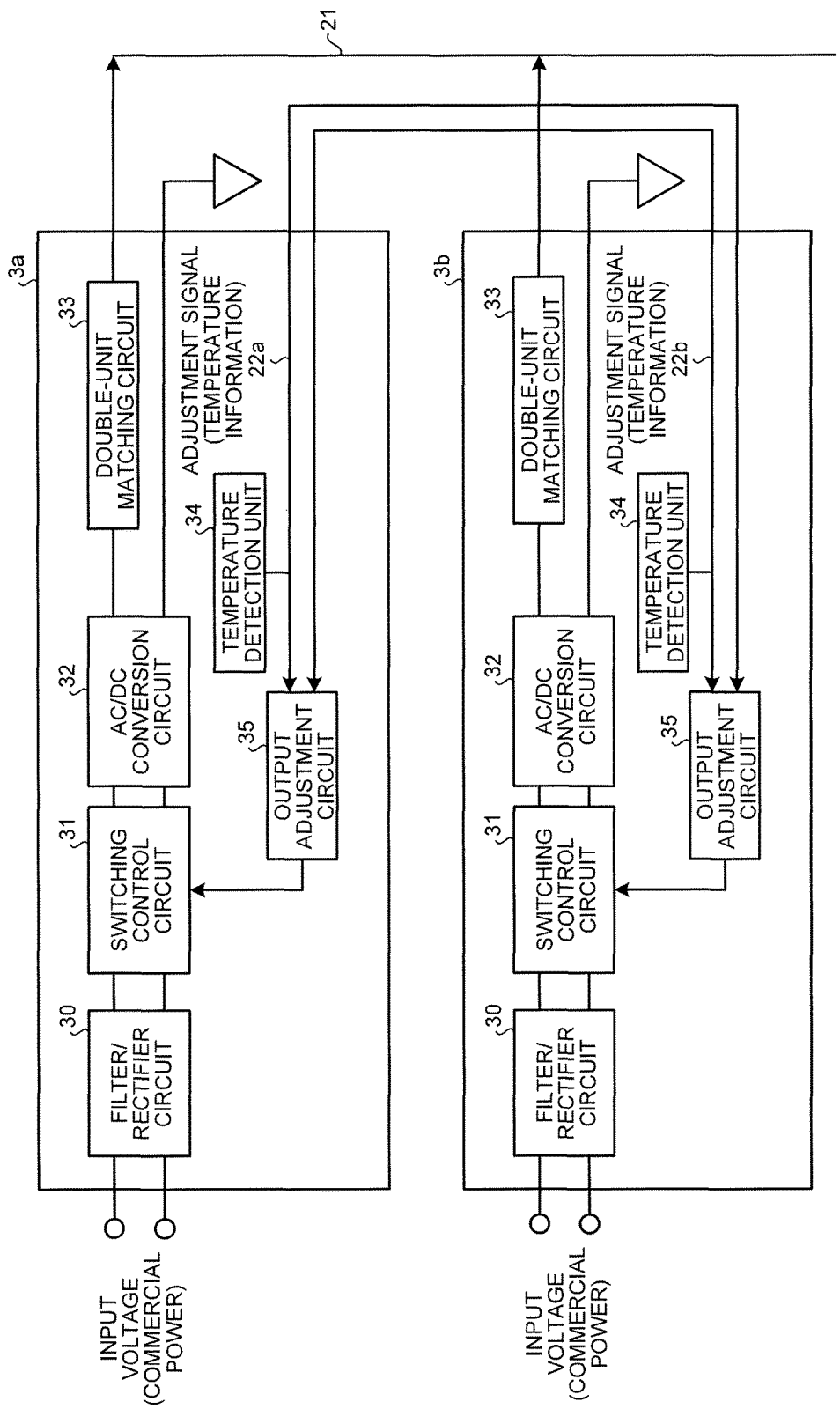
FIG. 2 is a configuration diagram of a power supply unit according to the first embodiment.

FIG. 2 is a configuration diagram of the power supply units 3a and 3b according to the first embodiment. Because the power supply units 3a and 3b are identical in configuration, the configuration of the power supply unit 3a is typically explained below.

The power supply unit 3a includes a filter/rectifier circuit 30, a switching control circuit 31, an AC/DC conversion circuit 32, a double-unit matching circuit 33, a temperature detection unit 34, and an output adjustment circuit 35.

The filter/rectifier circuit 30 rectifies and smoothes alternating-current (AC) commercial power and generates direct-current (DC) power. The switching control circuit 31 converts the DC power generated by the filter/rectifier circuit 30 into AC power having a magnitude in response to a control signal supplied form the output adjustment circuit 35. The control signal is for designating the magnitude of the power output from the power supply unit 3a, and a duty cycle is adopted as the magnitude of the control signal to be designated by the control signal as an example. The switching control circuit 31 generates the AC power by switching the DC power generated by the filter/rectifier circuit 30 so that a ratio of an ON-state period to an OFF-state period of the DC power is equal to the duty cycle designated by the control signal.

The AC/DC conversion circuit 32 rectifies and smoothes the AC power generated by the switching control circuit 31 and generates the internal power used within the PLC 1.

The double-unit matching circuit 33 is connected to a high-potential-side load connection line out of two lines via which the AC/DC conversion circuit 32 supplies the internal power. The double-unit matching circuit 33 is a circuit that prevents the generated internal power from flowing backward to the power supply unit 3a, and is configured by a diode or an FET, for example. Note that a low-potential-side load connection line is connected to a signal ground.

A voltage of the internal power that is generated by the AC/DC conversion circuit 32 and that is output via the double-unit matching circuit 33 has a value in proportion to the duty cycle of the AC power output from the switching control circuit 31. Furthermore, a magnitude relation between the voltage of the internal power generated by the power supply unit 3a and a voltage of internal power generated by the power supply unit 3b determines the ratio of outputs from the two power supply units 3a and 3b. The ratio of the output from the power supply unit 3a becomes higher as the voltage of the internal power generated by the power supply unit 3a is higher than that of the internal power generated by the power supply unit 3b. That is, the output adjustment circuit 35 can operate the ratio of the output responsible for the own power supply unit 3a by operating the control signal.

Each of the power supply units 3a and 3b is configured to include many life-limited components. The life-limited component refers to a component that degrades in proportion to an operating time and that becomes unusable after the passage of a certain period of time because of a failure, inability to attain an intended function or the like. For example, smoothing capacitors included in the filter/rectifier circuit 30, the AC/DC conversion circuit 32 or the like are representative life-limited components. These life-limited components have characteristics that degradation speeds accelerate as the temperature rises. For example, it is considered that a life of an electrolytic capacitor generally used as the smoothing capacitor decreases by half whenever the temperature rises by 10 degrees (centigrade). Meanwhile, each of the power supply units 3a and 3b includes a heating component. For example, a diode or an FET that constitutes the double-unit matching circuit 33 is the heating component. Because the power supply unit 3b is attached to the base unit 2 while the other constituent units are adjacent to both sides of the power supply unit 3b, more heat tends to be present in the power supply unit 3b than the power supply unit 3a only to one side of which another constituent element is adjacent. Therefore, when the ratios of the outputs from the power supply units 3a and 3b are equalized, then the power supply units 3a and 3b are equal in an amount of the heat generated inside, and an internal temperature of the power supply unit 3b is higher than that of the power supply unit 3a. As a result, a replacement cycle of the power supply unit 3b becomes shorter than that of the power supply unit 3a owing to a difference in the life of each of the life-limited components. According to the first embodiment, the power supply units 3a and 3b adjust loads, respectively so as to make the internal temperatures equal to each other.

The temperature detection unit 34 is configured to include a temperature sensor that detects a device internal temperature of the power supply unit 3a, and outputs temperature information in proportion to the detected temperature. The temperature information output from the temperature detection unit 34 is input to the output adjustment circuit 35 of the own power supply unit 3a, and is also input to the power supply unit 3b as the adjustment signal 22a. As the temperature sensor included in the temperature detection unit 34, a thermistor, a thermocouple or the like can be adopted. When the thermistor is adopted as the temperature sensor, the temperature detection unit 34 can be configured to include a circuit that measures an electric resistance of the thermistor and a circuit that converts the measured electric resistance into the temperature information. When the thermocouple is adopted as the temperature sensor, the temperature detection unit 34 can be configured to include a circuit that measures an electromotive force of the thermocouple and a circuit that converts the measured electromotive force into the temperature information. Alternatively, an output value from the temperature sensor can be used as the temperature information.

The temperature sensor can be provided at any position as long as the temperature sensor can detect the temperature that has a positive correlation with a temperature of the heating component at the position. For example, the temperature sensor is provided near the heating component included in the power supply unit 3a. Alternatively, a plurality of temperature sensors can be provided at a plurality of positions within the power supply unit 3a, respectively, and the temperature detection unit 34 can generate the temperature information by performing a predetermined arithmetic operation such as an averaging process on output values from the temperature sensors.

The temperature information output from the temperature detection unit 34 that the power supply unit 3b includes is input to the power supply unit 3a as the adjustment signal 22b.

The output adjustment circuit 35 compares the temperature information on the power supply unit 3a (the adjustment signal 22a) with the temperature information on the power supply unit 2b (the adjustment signal 22b), and generates the control signal to be supplied to the switching control circuit 31 based on a comparison result. Specifically, the output adjustment circuit 35 decreases the power output from the switching control circuit 31 of the power supply unit 3a when the internal temperature of the power supply unit 3a is higher than that of the power supply unit 3b, and increases the output power when the internal temperature of the power supply unit 3a is lower than that of the power supply unit 3b.

Figure 3:
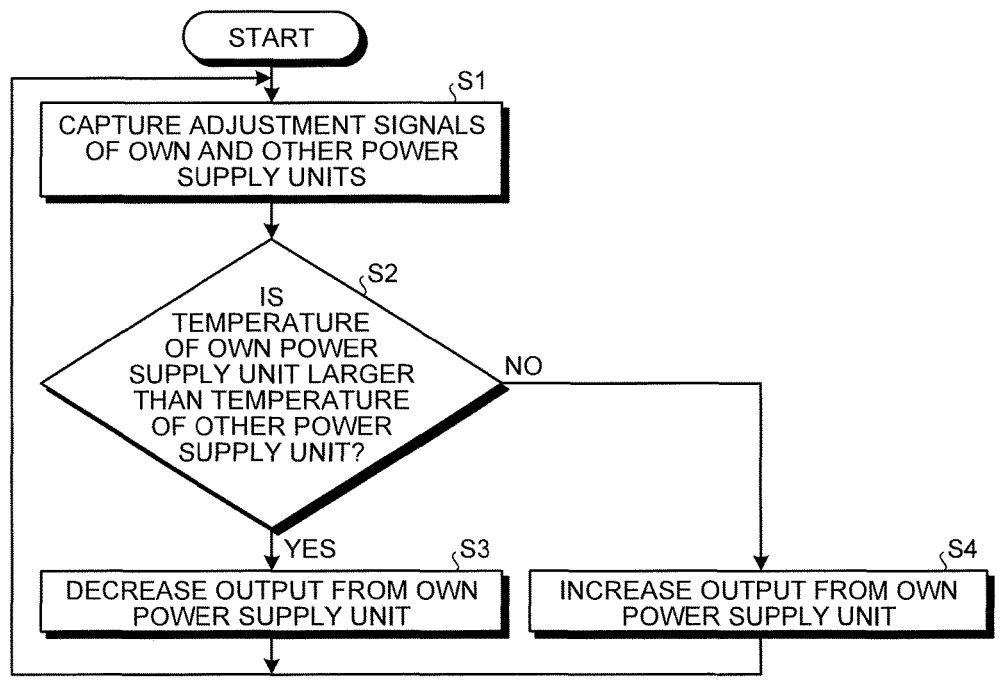
FIG. 3 is a flowchart for explaining an operation performed by the power supply unit according to the first embodiment.

FIG. 3 is a flowchart for explaining an operation performed by the power supply unit 3a according to the first embodiment. First, the output adjustment circuit 35 captures values of the adjustment signals 22a and 22b (Step S1). The output adjustment circuit 35 compares the value of the adjustment signal 22a with that of the adjustment signal 22b, thereby determining whether the internal temperature of the power supply unit 3a (own power supply unit) is higher than that of the power supply unit 3b (other power supply unit) (Step S2). When the internal temperature of the power supply unit 3a is higher than that of the power supply unit 3b (YES at Step S2), the output adjustment circuit 35 operates the control signal to be supplied to the switching control circuit 31 to decrease the power output from the own power supply unit 3a (Step S3). When the internal temperature of the power supply unit 3a is lower than that of the power supply unit 3b (NO at Step S2), the output adjustment circuit 35 operates the control signal to be supplied to the switching control circuit 31 to increase the power output from the own power supply unit 3a (Step S4). After a process at Step S3 or Step S4, the operation proceeds to a process at Step S1.

As described above, while repeating a loop process from Step S1 to Step S3 or S4, the internal temperature of the power supply unit 3a becomes equal to that of the power supply unit 3b, and the degradation speed of each of the life-limited components included in the power supply unit 3a eventually becomes equal to that of each of the corresponding life-limited components included in the power supply unit 3b. That is, the power supply units 3a and 3b becomes equal in replacement time when the power supply units 3a and 3b start to be used at the same time. The power supply units 3a and 3b becomes equal in replacement cycle when the power supply units 3a and 3b start to be used at a different time.

An increase or decrease width of the output power in the process at Step S3 or Step S4 is not limited to a specific value. The output power can be increased or decreased by a predetermined step size or the increase or decrease width can be set to a value in proportion to the difference in the internal temperature between the own and other power supply units.

As described above, according to the first embodiment, the power supply unit 3a is configured to include the temperature detection unit 34 that detects the internal temperature of the own power supply unit 3a, and the output adjustment circuit 35 that compares the detected temperature by the temperature detection unit 34 of the own power supply unit 3a with that by the temperature detection unit 34 included in the other power supply unit 3b, that decreases the internal power output from the own power supply unit 3a when the internal temperature of the own power supply unit 3a is higher than that of the other power supply unit 3b, and that increases the internal power output from the own power supply unit 3a when the internal temperature of the own power supply unit 3a is lower than that of the other power supply unit 3b. Therefore, by making the internal temperatures of the power supply units 3a and 3b equal, it is possible to make the degradation speed of each of the life-limited components included in the power supply unit 3a equal to that in the power supply unit 3b, and to eventually make the replacement time of the power supply unit 3a equal to that of the power supply unit 3b.

Second Embodiment.

According to the first embodiment, the power supply unit adjusts the output from the own power supply unit so as to make the internal temperature equal to that of the other power supply unit attached to the same PLC. Alternatively, the power supply unit can adjust the output from the own power supply unit so as to make not the temperature itself but a value that includes, as a part, an element that increases or decreases in proportion to the temperature equal to that of the other power supply unit. In a second embodiment, a power supply unit that adjusts the output so as to eliminate a difference between the own power supply unit and the other power supply unit in a sum of the internal temperature and an output current is explained. To be precise, the sum of the internal temperature and the output current is a sum of a value obtained by converting the detected temperature into a voltage and a detected current of the output current.

Figure 4:
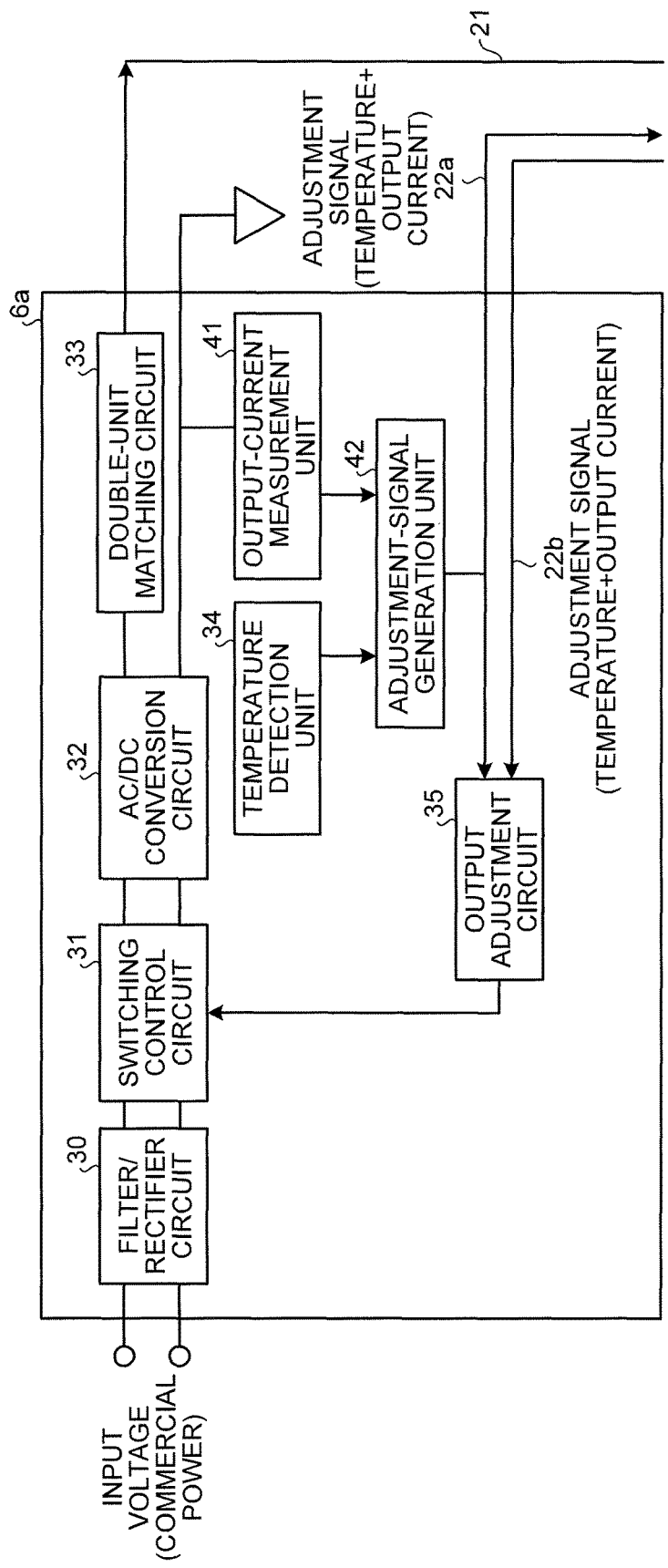
FIG. 4 is a configuration diagram of a power supply unit according to a second embodiment.

FIG. 4 is a configuration diagram of a power supply unit according to the second embodiment. Reference signs 6a and 6b are given to the respective power supply units according to the second embodiment, thereby distinguishing the power supply units 6a and 6b from the power supply units 3a and 3b according to the first embodiment. Constituent elements identical to those according to the first embodiment are denoted by like reference signs and redundant explanations thereof will be omitted. In addition, because the power supply units 6a and 6b are identical in configuration, the power supply unit 6a is typically explained below.

As shown in FIG. 4, the power supply unit 6a includes the filter/rectifier circuit 30, the switching control circuit 31, the AC/DC conversion circuit 32, the double-unit matching circuit 33, an output-current measurement unit 41, the temperature detection unit 34, an adjustment-signal generation circuit 42, and the output adjustment circuit 35.

The output-current measurement unit 41 measures a current output to the power supply line 21, and outputs current information that indicates the current obtained by measurement. The output-current measurement unit 41 can measure the current by a simple method such as a method of interposing, for example, a small load resistor on a wire to which a current is output and measuring a voltage between both ends of the small load resistor. According to an example shown in FIG. 4, the output-current measurement unit 41 is configured to measure the current flowing to the signal ground.

The adjustment-signal generation unit 42 generates the adjustment signal 22a based on the current information and the temperature information. It is assumed that the adjustment-signal generation unit 42 generates a value obtained by adding up a measurement value of the internal temperature and a measurement value of the output current as the adjustment signal 22a.

The output adjustment circuit 35 adjusts an output from the switching control circuit 31 based on comparison of the adjustment signal 22a with the adjustment signal 22b.

Figure 5:
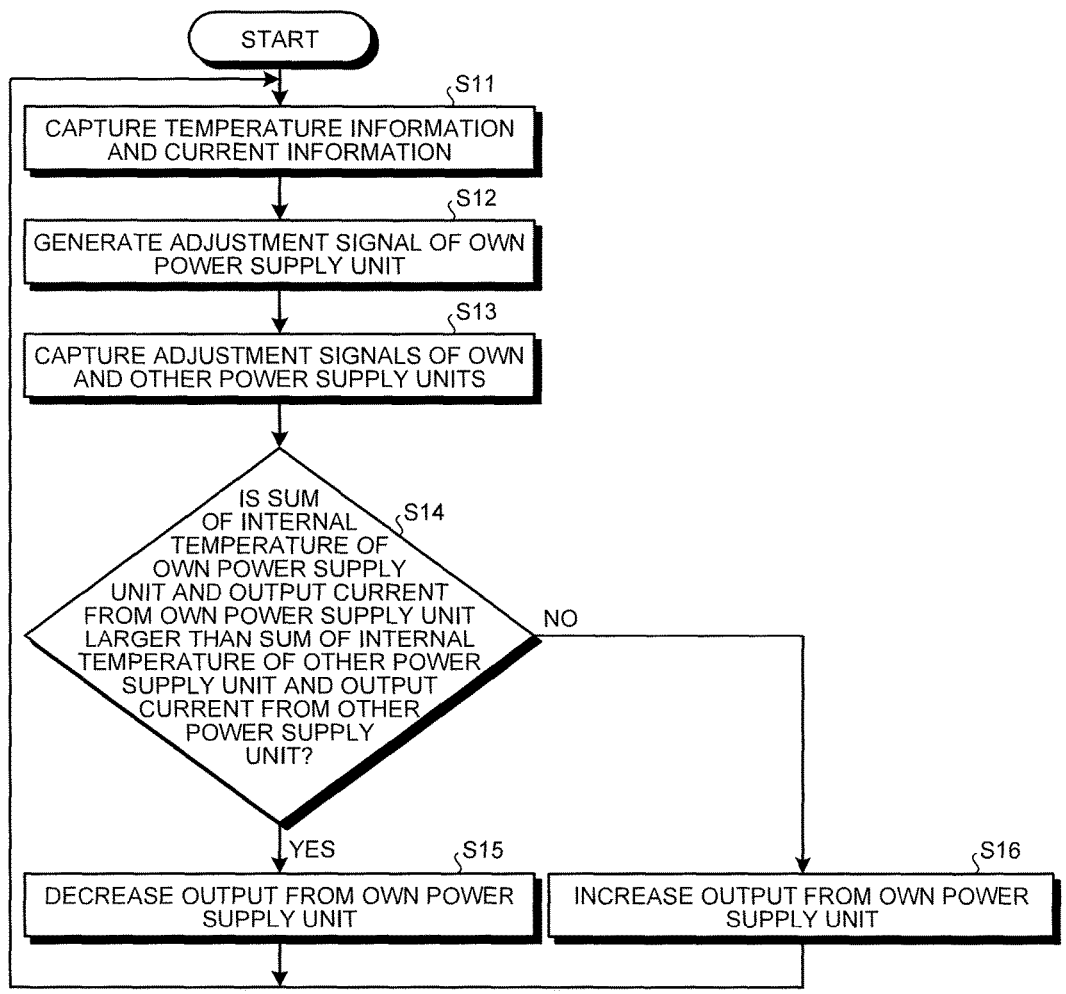
FIG. 5 is a flowchart for explaining an operation performed by the power supply unit according to the second embodiment.

FIG. 5 is a flowchart for explaining an operation performed by the power supply unit 6a according to the second embodiment. First, as shown in FIG. 5, the adjustment-signal generation unit 42 captures the temperature information and the current information (Step S11), and generates the adjustment signal 22a based on the captured information (Step S12). The output adjustment circuit 35 captures the adjustment signals 22a and 22b (Step S13), and determines whether the sum of the internal temperature and the output current of the own power supply unit 6a is larger than the sum of the internal temperature and the output current of the other power supply unit 6b (Step S14). When the sum of the internal temperature and the output current of the own power supply unit 6a is larger than the sum of the internal temperature and the output current of the other power supply unit 6b (YES at Step S14), the output adjustment circuit 35 decreases the power output from the own power supply unit 6a (Step S15). When the sum of the internal temperature and the output current of the own power supply unit 6a is smaller than the sum of the internal temperature and the output current of the other power supply unit 6b (NO at Step S14), the output adjustment circuit 35 increases the power output from the own power supply unit 6a (Step S16). After a process at Step S15 or Step S16, the operation proceeds to a process at Step S11.

In this manner, the output adjustment circuit 35 adjusts the output so as to make the sum of the internal temperature and the output current of the power supply unit 6a equal to the sum of the internal temperature and the output current of the power supply unit 6b. When the outputs are equalized, that is, when the output currents from the power supply units 6a and 6b are equal, then the internal temperature of the power supply unit 6b is higher than that of the power supply unit 6a, and the power supply unit 6b is higher than the power supply unit 6a in the sum of the internal temperature and the output current. Therefore, the output from the power supply unit 6a is adjusted to be increased when it is determined NO at Step S14, and the output from the power supply unit 6b is adjusted to be decreased when it is determined YES at Step S14. By this adjustment, it is possible to reduce the difference in the internal temperature between the power supply units 6a and 6b as compared with a case of equalizing the output currents although the power supply units 6a and 6b are not equal in the internal temperature. That is, when the power supply units 6a and 6b start to be used at the same time, a replacement time lag between the power supply units 6a and 6b can be made shorter. When the power supply units 6a and 6b start to be used at the different time, the difference in the replacement cycle between the power supply units 6a and 6b can be made smaller.

As described above, according to the second embodiment, the power supply unit 6a is configured to further include the output-current measurement unit 41 that measures the output current from the own power supply unit 6a, and configured so that the output adjustment circuit 35 decreases the internal power output from the own power supply unit 6a when the sum of the detected temperature of the own power supply unit 6a and the measured output current of the own power supply unit 6a is larger than the sum of the detected temperature of the other power supply unit 6b and the measured output current of the own power supply unit 6b, and so that the output adjustment circuit 43 increases the internal power output from the own power supply unit 6a when the sum of the detected temperature of the own power supply unit 6a and the measured output current of the own power supply unit 6a is smaller than the sum of the detected temperature of the other power supply unit 6b and the measured output current of the own power supply unit 6b. Therefore, it is possible to reduce the replacement time lag between the power supply units 6a and 6b, as compared with the case of equalizing the outputs between the power supply units 6a and 6b.

In the second embodiment, it has been explained that the output adjustment circuit 35 compares the sum of the internal temperature and the output current of the own power supply unit 6a with the sum of the internal temperature and the output current of the other power supply unit 6b. However, any values can be adopted as the values used for the comparison as long as each of the values includes, as a part, the element that increases or decreases in proportion to the increase or decrease in the internal temperature. This is because the output adjustment circuit 35 can adjust the output so as to reduce the difference between the internal temperatures as long as each of the values includes, as a part, the element that increases or decreases in proportion to the increase or decrease in the internal temperature as the value for the comparison.

Third Embodiment.

Figure 6:
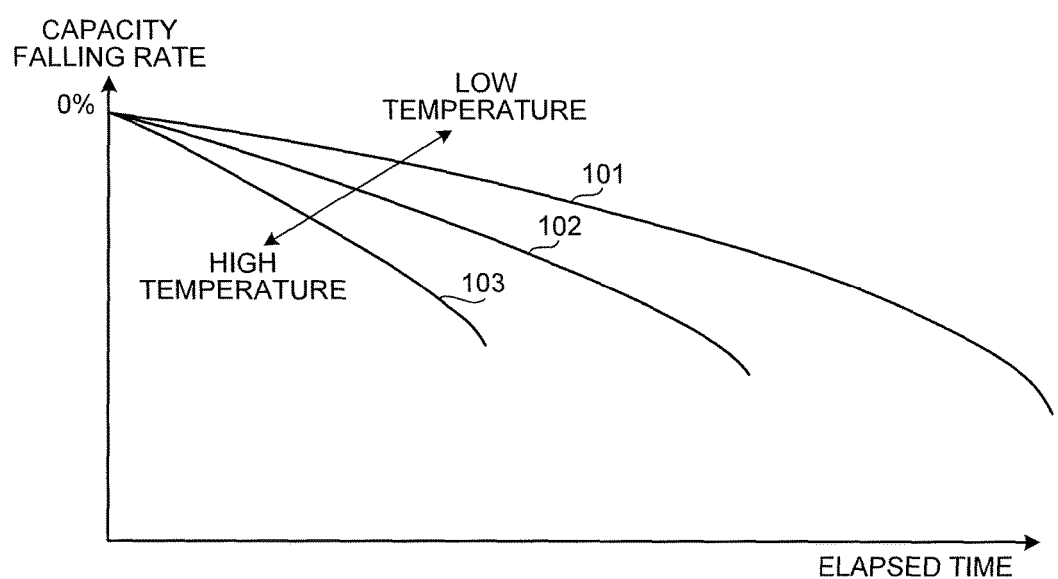
FIG. 6 depicts degradation characteristics of a smoothing capacitor.

FIG. 6 depicts degradation characteristics of the smoothing capacitor. A vertical axis represents a falling rate of a capacity of the smoothing capacitor, and a horizontal axis represents an elapsed time since the smoothing capacitor starts operating. Characteristic curves 101, 102, and 103 represent degradation characteristics when the smoothing capacitor is used at low, medium, and high temperatures, respectively. As shown in FIG. 6, the capacity tends to fall at an earlier time as the smoothing capacitor is used at a higher temperature. When the capacity falls below a predetermined value, the power supply unit becomes unusable (that is, fails). In a third embodiment, the power supply unit adjusts the output from the own power supply unit so as to reduce a difference in an operating time between the own and other power supply units before the life of each of the life-limited components ends. As an example of the life-limited components for which the operable-time estimated value is calculated, smoothing capacitors included in the AC/DC conversion circuit are exemplified.

Figure 7:
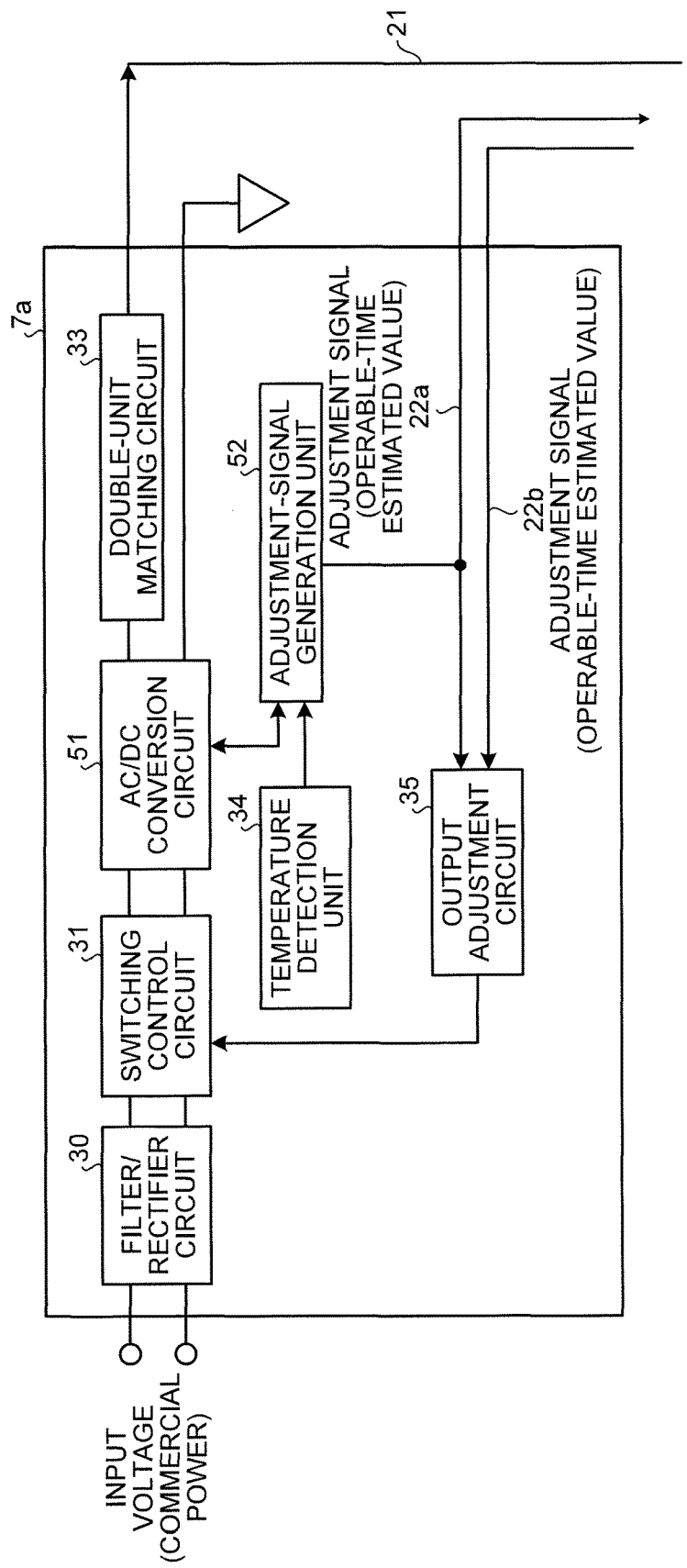
FIG. 7 is a configuration diagram of a power supply unit according to a third embodiment.

FIG. 7 is a configuration diagram of a power supply unit according to the third embodiment. Reference signs 7a and 7b are given to the respective power supply units according to the third embodiment, thereby distinguishing the power supply units 7a and 7b from the power supply units 3a and 3b according to the first embodiment. Constituent elements identical to those according to the first embodiment are denoted by like reference signs and redundant explanations thereof will be omitted. In addition, because the power supply units 7a and 7b are identical in configuration, the power supply unit 7a is typically explained below.

As shown in FIG. 7, the power supply unit 7a includes the filter/rectifier circuit 30, the switching control circuit 31, an AC/DC conversion circuit 51, the double-unit matching circuit 33, the temperature detection unit 34, an adjustment-signal generation circuit 52, and the output adjustment circuit 35.

Figure 8:
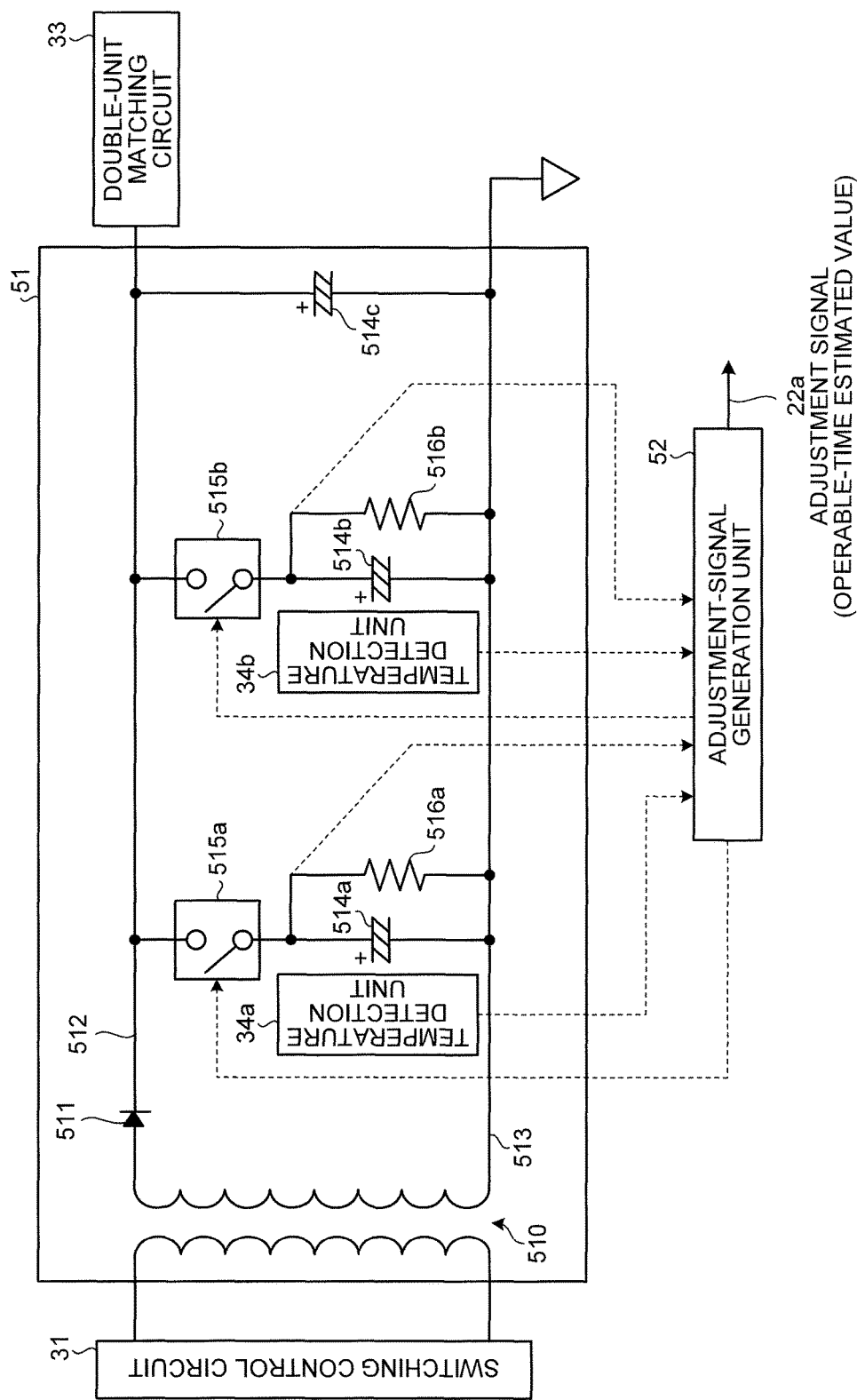
FIG. 8 is a configuration diagram of an AC/DC conversion circuit.

FIG. 8 is a configuration diagram of the AC/DC conversion circuit 51. As shown in FIG. 8, the AC/DC conversion circuit 51 includes a transformer 510 that captures energy of the AC power generated by the switching control circuit 31. A diode 511 for rectification is inserted on a load connection line 512 that is a high-potential-side live line to which one end of the transformer 510 and the double-unit matching circuit 33 are connected. Furthermore, smoothing capacitors 514a to 514c are connected in parallel between the high-potential-side load connection line 512 and a load connection line 513 that is a low-potential-side (signal-ground-side) live line on a side closer to the double-unit matching circuit 33 than the diode 511.

Furthermore, a switching element 515a that is turned on or off in response to a diagnosis control signal from the adjustment-signal generation circuit 52 is inserted near the load connection line 512 out of the load connection lines 512 and 513 to which the smoothing capacitor 514a is connected. Furthermore, a discharge resistor 516a for diagnosing the smoothing capacitor 514a is connected to both ends of the smoothing capacitor 514a. A temperature detection unit 34a is provided near the smoothing capacitor 514a, and the temperature detection unit 34a detects a temperature near the smoothing capacitor 514a.

Similarly, a switching element 515b that is turned on or off in response to the diagnosis control signal from the adjustment-signal generation circuit 52 is inserted near the load connection line 512 out of the load connection lines 512 and 513 to which the smoothing capacitor 514a is connected. Furthermore, a discharge resistor 516b for diagnosing the smoothing capacitor 514b is connected to both ends of the smoothing capacitor 514b. A temperature detection unit 34b is provided near the smoothing capacitor 514b, and the temperature detection unit 34b detects a temperature near the smoothing capacitor 514b.

The temperature detection units 34a and 34b correspond to the temperature detection unit 34 shown in FIG. 7.

At a normal time, both the switching elements 515a and 515b are kept to be turned on to make a state where the smoothing capacitors 514a to 514c are electrically connected between the high-potential-side load connection line 512 (Vcc) and the low-potential-side load connection line 513 (0 volt). That is, the smoothing capacitors 514a to 514c realize a smoothing function of the AC/DC conversion circuit 51 as a whole.

At diagnosis, the switching elements 515a and 515b are sequentially switched from ON-states to OFF-states in response to the diagnosis control signal from the adjustment-signal generation circuit 52, and the smoothing capacitors 514a and 514b are sequentially disconnected from the load connection line 512. When the switching elements 515a and 515b are turned off, electric charge accumulated in the smoothing capacitors 514a and 514b is discharged through the discharge resistors 516a and 516b, respectively. Note that the adjustment-signal generation unit 52 does not generate a control signal for turning off the switching element 515b when outputting a control signal for turning off the switching element 515a. That is, both the smoothing capacitors 514a and 514b are not simultaneously electrically disconnected from the load connection line 512. This enables the smoothing capacitors 514a and 514b to be diagnosed while the power supply unit 7a is operating.

When a resistance of the switching element 515a during conduction is regarded as "0Ω" and a time for which a voltage of the smoothing capacitor 514a falls from Vcc (an active line voltage) to Vref (a predetermined defined voltage between 0 and Vcc, for example) is regarded as a discharge base time T1, this discharge base time T1 can be expressed by the following Equation (1).

$$T1 = C R \cdot R 1 \cdot \ln(Vcc/Vref) \tag{1}$$

C1: Capacity of smoothing capacitor 514a
R1: Resistance of discharge resistor 516a The adjustment-signal generation unit 52 measures a time T2 for which the discharge starts and the voltage of the smoothing capacitor 514a changes from Vcc to Vref, and calculates an operable time (an operable-time estimated value) before the smoothing capacitor 514a becomes unusable based on the measured time T2 and the temperature information from the temperature detection unit 34a. The adjustment-signal generation unit 52 can calculate the operable-time estimated value by using a reference table in which a relation among three elements, for example, temperature, elapsed time, and discharge time is held.

Furthermore, the adjustment-signal generation unit 52 measures the time T2 for the smoothing capacitor 514b similarly to the case of measuring the time T2 for the smoothing capacitor 514a, and calculates an operable-time estimated value based on the measured time T2 and the temperature information from the temperature detection unit 34b. The adjustment-signal generation unit 52 outputs the smaller of the two calculated operable-time estimated values as the adjustment signal 22a. Alternatively, the adjustment-signal generation unit 52 can output a value obtained by performing a predetermined arithmetic operation on the two operable-time estimated values such as an average value of the two calculated operable-time estimated values as the adjustment signal 22a.

The output adjustment circuit 35 compares the operable-time estimated value related to the own power supply unit 7a and that related to the other power supply unit 7b that are input as the adjustment signals 22a and 22b, respectively, with each other. The output adjustment circuit 35 decreases the power output from the own power supply unit 7a when the operable-time estimated value related to the own power supply unit 7a is smaller than that related to the other power supply unit 7b, and increases the power output from the own power supply unit 7b when the operable-time estimated value related to the own power supply unit 7a is larger than that related to the other power supply unit 7b.

Figure 9:
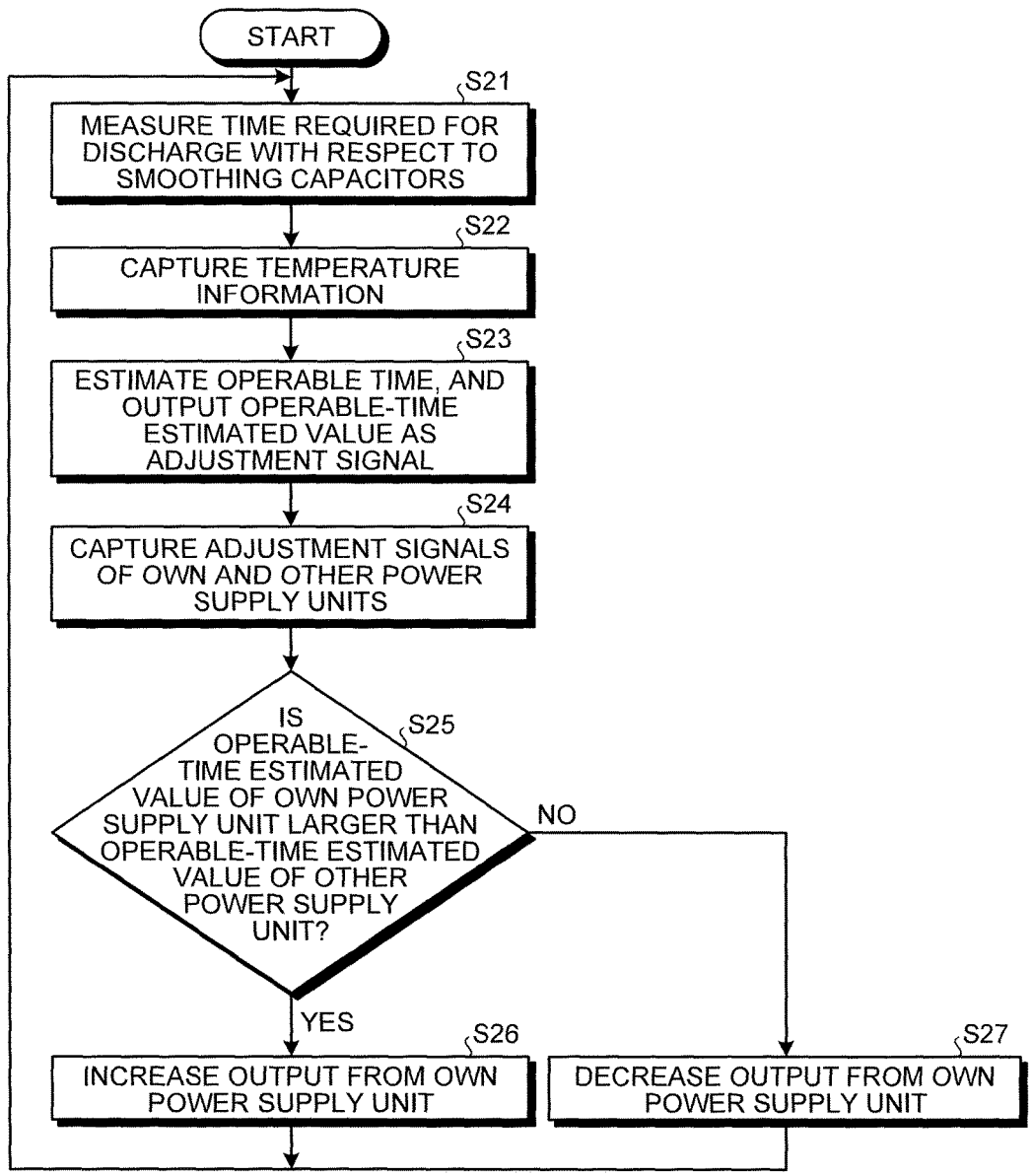
FIG. 9 is a flowchart for explaining an operation performed by the power supply unit according to the third embodiment.

FIG. 9 is a flowchart for explaining an operation performed by the power supply unit 7a according to the third embodiment. First, as shown in FIG. 9, the adjustment-signal generation unit 52 performs measurement of the time T2 required for the discharge with respect to each of the smoothing capacitors 514a and 514b (Step S21). Specifically, the adjustment-signal generation unit 52 operates the diagnosis control signal, turns off the switching element 515a for a time enough to complete the measurement, and measures the time T2 before the voltage of the smoothing capacitor 514a becomes equal to Vref. After measuring the time T2 related to the smoothing capacitor 514a, the adjustment-signal generation unit 52 turns on the switching element 515a, turns off the switching element 515b, and measures the time T2 before the voltage of the smoothing capacitor 514a becomes equal to Vref. The adjustment-signal generation unit 52 turns on the switching element 515b after measuring the time T2 related to the smoothing capacitor 514b.

The adjustment-signal generation unit 52 captures the temperature information from the temperature detection units 34a and 34b (Step S22). The adjustment-signal generation unit 52 calculates the operable-time estimated values for the smoothing capacitors 514a and 514b, respectively based on the measured values of the time T2 and the temperature information, and outputs the smaller of the two calculated operable-time estimated values as the adjustment signal 22a (Step S23).

Thereafter, the output adjustment circuit 35 captures the adjustment signals 22a and 22b (Step S24), and determines whether the operable-time estimated value related to the own power supply unit 7a is larger than that related to the other power supply unit 7b (Step S25). When the operable-time estimated value related to the own power supply unit 7a is larger than that related to the other power supply unit 7b (YES at Step S25), the output adjustment circuit 35 increases the power output from the own power supply unit 7a (Step S26). When the operable-time estimated value related to the own power supply unit 7a is smaller than that related to the other power supply unit 7b (NO at Step S25), the output adjustment circuit 35 decreases the power output from the own power supply unit 7a (Step S27). After a process at Step S26 or Step S27, the operation proceeds to a process at Step S21.

It has been explained above that the operable-time estimated values calculated based on the measured values of the time T2 and the temperature information are adopted as the adjustment signals 22a and 22b. However, not the operable-time estimated values but any information can be adopted as the adjustment signals 22a and 22b as long as the information is information (degradation state information) indicating degradations in the smoothing capacitors 514a and 514b. It suffices that the output adjustment circuit 35 adjusts the output so as to make the time when each of the life-limited components of the own power supply unit 7a becomes unusable closer to the time when each of the life-limited components of the other power supply unit 7b becomes unusable based on the information indicating the degradations. For example, when the measured values of the time T2 (that is, minimum or average values of the measured values of the time T2 related to the smoothing capacitors 514a and 514b) are assumed as the adjustment signals 22a and 22b, it suffices that the output adjustment circuit 35 of the own power supply unit 7a decreases the output from the own power supply unit 7a when the measured value of the time T2 related to the own power supply unit 7a is smaller than that related to the other power supply unit 7b, and increases the output when the measured value of the time T2 related to the power supply unit 7a is larger than that related to the other power supply unit 7b. Alternatively, when measured values of capacities C1 (that is, minimum or average values of the measured values of the capacities C1 related to the smoothing capacitors 514a and 514b) are assumed as the adjustment signals 22a and 22b, it suffices that the output adjustment circuit 35 of the own power supply unit 7a decreases the output from the own power supply unit 7a when the capacity C1 related to the own power supply unit 7a is smaller than that related to the other power supply unit 7b, and increases the output when the capacity C1 related to the own power supply unit 7a is larger than that related to the other power supply unit 7b. Furthermore, the information that indicates the degradations in the smoothing capacitors 514a and 514b can be obtained not from the measured values of the time T2 but from the temperature information. For example, as the information that indicates the degradations in the smoothing capacitors 514a and 514b, values obtained by integrating the temperature information detected by the temperature detection units 34a and 34b by an elapsed time can be adopted.

Furthermore, while it has been explained that the power supply unit 7a adjusts the output based on comparison of the operable-time estimated values related to the smoothing capacitors 514a and 514b, the power supply unit 7a can adjust the output based on the comparison of operable-time estimated values of the life-limited components included in the other constituent element (for example, the smoothing capacitors included in the filter/rectifier circuits 30) or of the double-unit matching circuit 33 related to the own and other power supply units 7a and 7b, or based on the comparison of the operable-time estimated values of a plurality of life-limited components related to the own and other power supply units 7a and 7b.

Further, it has been explained that the power supply unit 7a includes the two temperature detection units 34a and 34b and that the temperature detection units 34a and 34b detect the temperatures near the smoothing capacitors 514a and 514b, respectively. However, the number of temperature detection units that the power supply unit 7a includes is not limited to two. This is because the temperatures of the smoothing capacitors 514a and 514b can be calculated by correcting the detected temperatures using a correlation between the detected temperatures and the temperatures near the smoothing capacitors 514a and 514b when such a correlation is present.

As described above, according to the third embodiment, the power supply unit 7a includes the adjustment-signal generation unit 52 serving as a degradation-state calculation unit that calculates the degradation state information on the life-limited components included in the own power supply unit 7a, and the output adjustment circuit 35 that adjusts the internal power output from the own power supply unit 7a so as to make the time at which each of the life-limited components of the own power supply unit 7a becomes unusable closer to the time at which each of the life-limited components of the other power supply unit 7b becomes unusable based on the degradation state information on the own and other power supply units 7a and 7b. Therefore, it is possible to reduce the replacement time lag between the own and other power supply units 7a and 7b, as compared with the case of equalizing the outputs from the own and other power supply units 7a and 7b.

The power supply unit 7a also includes the temperature detection units 34a and 34b that detect the internal temperatures of the own power supply unit 7a. The adjustment-signal generation unit 52 estimates the operable time of each of the life-limited components based on the detected temperatures. The output adjustment circuit 35 increases the internal power output from the own power supply unit 7a when the operable-time estimated value of each of the life-limited components of the own power supply unit 7a is larger than that of the other power supply unit 7b, and decreases the internal power output from the own power supply unit 7a when the operable-time estimated value of each of the life-limited components of the own power supply unit 7a is smaller than that of the other power supply unit 7b. Therefore, it is possible to make the replacement time of the own power supply unit 7a equal to that of the other power supply unit 7b.

Fourth Embodiment.

According to the third embodiment, when one of the two power supply units that start operating simultaneously from brand-new states fails and only the fault power supply unit is replaced, a great difference arises between the degradation state of the power supply unit that is not replaced and that of the new power supply unit, resulting in a situation in which load is concentrated only on the new power supply unit. According to a fourth embodiment, when there is a great difference between the degradation states of the two power supply units provided as double units, outputs from the two power supply units are adjusted so as to reduce a temperature difference. When the difference between the degradation states of the two power supply unit falls in a tolerance range, the outputs from the two power supply units are adjusted so as to reduce the difference between the two power supply units in the operating time before the life of each of the life-limited components ends.

Figure 10:
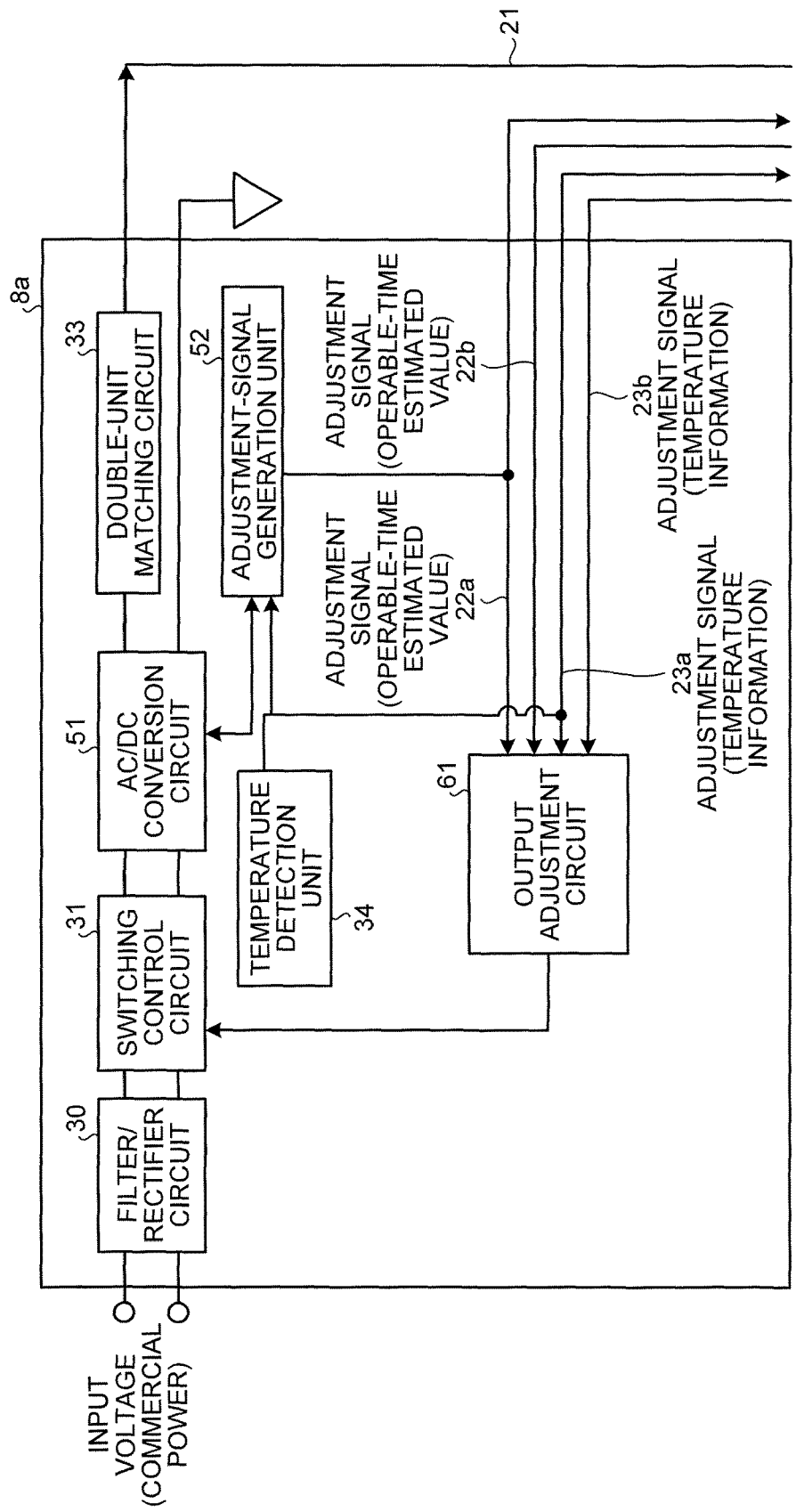
FIG. 10 is a configuration diagram of a power supply unit according to a fourth embodiment.

FIG. 10 is a configuration diagram of a power supply unit according to the fourth embodiment. Reference signs 8a and 8b are given to the respective power supply units according to the fourth embodiment, thereby distinguishing the power supply units 8a and 8b from the power supply units 3a and 3b according to the first embodiment. Constituent elements identical to those according to the first to third embodiments are denoted by like reference signs and redundant explanations thereof will be omitted. In addition, because the power supply units 8a and 8b are identical in configuration, the power supply unit 8a is typically explained below.

As shown in FIG. 10, the power supply unit 8a includes the filter/rectifier circuit 30, the switching control circuit 31, the AC/DC conversion circuit 51, the double-unit matching circuit 33, the temperature detection unit 34, the adjustment-signal generation circuit 52, and an output adjustment circuit 61.

The temperature information detected by the temperature detection unit 34 is input to the adjustment-signal generation unit 52, and is also input to the output adjustment circuit 61 of the own power supply unit 8a and to the other power supply unit 8b as an adjustment signal 23a. The temperature detection unit 34 is configured to include the temperature detection units 34a and 34b. The detected temperatures by the temperature detection units 34a and 34b are input to the adjustment-signal generation unit 52 as the temperature information. The higher of the two detected temperatures is output as the adjustment signal 23a. Note that the temperature detection unit 34 can output a value obtained by performing a predetermined arithmetic operation on the two detected temperatures such as an average value of the two detected temperatures as the adjustment signal 23a.

The adjustment-signal generation unit 52 calculates the operable-time estimated values of the smoothing capacitors 514a and 514b that the AC/DC conversion circuit 51 includes, and generates the adjustment signal 22a based on the calculated operable-time estimated values. It is assumed that the adjustment-signal generation unit 52 outputs the smaller of the operable-time estimated value related to the smoothing capacitor 514a and that related to the smoothing capacitor 514b as the adjustment signal 22a, similarly to the third embodiment.

The temperature information output from the temperature detection unit 34 included in the other power supply unit 8b is input to the power supply unit 8a as an adjustment signal 23b. The adjustment signal 22b output from the adjustment-signal generation unit 52 included in the other power supply unit 8b is also input to the power supply unit 8a.

The adjustment signals 22a, 22b, 23a, and 23b are input to the output adjustment circuit 61. The output adjustment circuit 61 determines whether to adjust the output so as to reduce the temperature difference or to adjust the output so as to reduce the difference in the operable-time estimated value based on the comparison of the adjustment signals (the adjustment signals 22a and 22b) related to the operable-time estimated values. The output adjustment circuit 61 adjusts the power output from the own power supply unit 8a based on a determined adjustment method.

Figure 11:
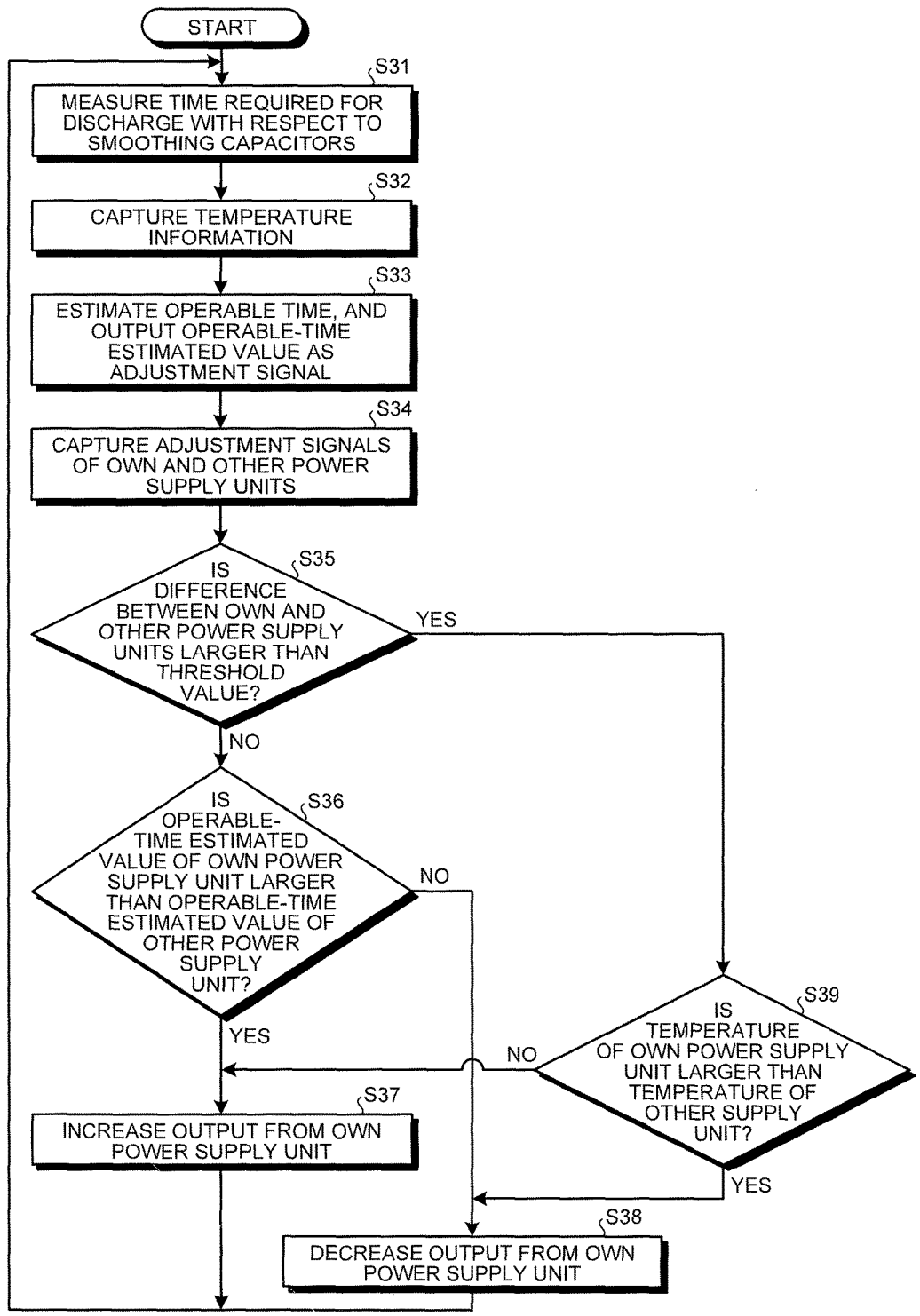
FIG. 11 is a flowchart for explaining an operation performed by the power supply unit according to the fourth embodiment.

FIG. 11 is a flowchart for explaining an operation performed by the power supply unit 8a according to the fourth embodiment. First, as shown in FIG. 11, the adjustment-signal generation unit 52 performs measurement of the time T2 required for the discharge with respect to each of the smoothing capacitors 514a and 514b (Step S31). The adjustment-signal generation unit 52 captures the temperature information from the temperature detection units 34a and 34b (Step S32). The adjustment-signal generation unit 52 calculates the operable-time estimated values based on the measured values of the time T2 and the temperature information, and outputs the smaller of the two calculated operable-time estimated values as the adjustment signal 22a (Step S33).

Thereafter, the output adjustment circuit 61 captures the adjustment signals 22a, 22b, 23a, and 23b (Step S34), and determines whether the difference between the operable-time estimated value of the own power supply unit 8a and that of the other power supply unit 8b is greater than a predetermined threshold (Step S35).

When the difference between the operable-time estimated value of the own power supply unit 8a and that of the other power supply unit 8b is smaller than the predetermined threshold (NO at Step S35), the output adjustment circuit 61 determines whether the operable-time estimated value of the own power supply unit 8a is larger than that of the other power supply unit 8b (Step S36). When the operable-time estimated value of the own power supply unit 8a is larger than that of the other power supply unit 8b (YES at Step S36), the output adjustment circuit 61 increases the power output from the own power supply unit 8a (Step S37). When the operable-time estimated value of the own power supply unit 8a is smaller than that of the other power supply unit 8b (NO at Step S36), the output adjustment circuit 61 decreases the power output from the own power supply unit 8a (Step S38). After a process at Step S37 or Step S38, the operation proceeds to a process at Step S31.

On the other hand, when the difference between the operable-time estimated value of the own power supply unit 8a and that of the other power supply unit 8b is greater than the predetermined threshold (YES at Step S35), the output adjustment circuit 61 determines whether the internal temperature of the own power supply unit 8a is higher than that of the other power supply unit 8b based on the comparison of the adjustment signals 23a and 23b (Step S39). When the internal temperature of the own power supply unit 8a is higher than that of the other power supply unit 8b (YES at Step S39), the output adjustment circuit 61 performs the process at Step S38. When the internal temperature of the own power supply unit 8a is lower than that of the other power supply unit 8b (NO at Step S39), the output adjustment circuit 61 performs the process at Step S37.

As described above, according to the fourth embodiment, the output adjustment circuit 61 is configured to compare the difference between the operable-time estimated values of the life-limited components of the own and other power supply units 8a and 8b with the predetermined threshold, to adjust the output from the own power supply unit 8a so as to make smaller the difference between the detected temperatures of the own and other power supply units 8a and 8b when the difference is greater than the threshold, and to adjust the output from the own power supply unit 8a so as to make the time at which each of the life-limited components of the own power supply unit 8a becomes unusable closer to the time at which each of the life-limited components of the other power supply unit 8b becomes unusable when the difference between the operable-time estimated values is smaller than the threshold. Therefore, when the difference between the operable-time estimated values exceeds the tolerance range, it is possible to reduce the difference between the replacement cycles of the power supply units 8a and 8b. When the difference between the operable-time estimated values falls within the tolerance range, it is possible to reduce the replacement time lag between the power supply units 8a and 8b. It is thereby possible to prevent the load from being concentrated on the brand-new power supply unit when only one of the two power supply units 8a and 8b is replaced by the brand-new power supply unit.

Hardware, software, or a combination thereof can realize a part of or all of constituent elements (the output adjustment circuit, the adjustment-signal generation unit, and the temperature detection unit) that constitute the power supply unit according to the first to fourth embodiments. To realize the constituent elements by software means that corresponding functions are realized by causing a microcomputer, for example, to execute a predetermined program.

INDUSTRIAL APPLICABILITY

As described above, the power supply device according to the present invention is preferable to be used as a power supply device incorporated in a PLC as one of double power supply devices.

REFERENCE SIGNS LIST

1 PLC
2 base unit
3a, 3b, 6a, 6b, 7a, 7b, 8a, 8b power supply unit
4 CPU unit
5 ordinary unit
21 power supply line
22a, 22b, 23a, 23b adjustment signal
30 filter/rectifier circuit
31 switching control circuit
32, 51 AC/DC conversion circuit
33 double-unit matching circuit
34, 34a, 34b temperature detection unit
35, 61 output adjustment circuit
41 output-current measurement unit
42, 52 adjustment-signal generation circuit
101, 102, 103 characteristic curve
510 transformer
511 diode
512 load connection line
513 load connection line
514a, 514b, 514c smoothing capacitor
515a, 515b switching element
516a, 516b discharge resistor

The invention claimed is:

1. A programmable controller (PLC) comprising:
two power supply devices, each of the power supply devices is adapted to generate internal power of the PLC from alternating-current commercial power and to output the internal power, and the power supply devices being an own power supply device and an other power supply device, the PLC comprising:
a degradation-state calculator that calculates degradation state information on a life-limited component included in the own power supply device; and
an output adjustment circuit is adapted to adjust an internal power output from the own power supply device to reduce a time lag between a time at which the life-limited component included in the own power supply device becomes unusable and a time at which the life-limited component included in the other power supply device becomes unusable based on the degradation state information calculated by the degradation-state calculator of the own power supply device and degradation state information calculated by a degradation-state calculation unit of the other power supply device attached to a same PLC as the PLC to which the own power supply device is attached.

2. The power supply device according to claim 1, wherein the degradation state information is an operable-time estimated value of the life-limited component, the power supply device further comprises a temperature detector adapted to detect an internal temperature of the own power supply device, the degradation-state calculator adapted to estimate an operable time of the life-limited component based on a detected temperature by the temperature detector, and the output adjustment circuit adapted to increase an internal power output from the own power supply device when the operable-time estimated value of the life-limited component of the own power supply device is larger than an operable-time estimated value of the life-limited component of the other power supply device, and to decrease the internal power output from the own power supply device when the operable-time estimated value of the life-limited component of the own power supply device is smaller than the operable-time estimated value of the life-limited component of the other power supply device.

3. The power supply device according to claim 2, wherein the output adjustment circuit is adapted to compare a difference between the operable-time estimated values of the life-limited components of the own and other power supply devices with a predetermined threshold, to adjust the internal power output from the own power supply device so as to make smaller a difference between a detected temperature by the temperature detector of the own power supply device and a detected temperature by a temperature detector included in the other power supply device attached to a same PLC as the PLC to which the own power supply device is attached when the difference between the operable-time estimated values is greater than the threshold, and adjusts the internal power output from the own power supply device so as to make smaller the time lag between the time at which the life-limited component included in the own power supply device becomes unusable and the time at which the life-limited component included in the other power supply device becomes unusable when the difference between the operable-time estimated values is smaller than the threshold.

4. The PLC according to claim 2, wherein
the life-limited component is a smoothing capacitor, and
the degradation-state calculator is adapted to measure a
   discharge time of the smoothing capacitor, and to
   estimate an operable time of the smoothing capacitor
   based on a measured discharge time and a detected
   temperature by the temperature detector.

* * * * *